G. E. KINCH.
NIGHT SOIL PAN AND DESTROYABLE LINING THEREFOR.
APPLICATION FILED OCT. 14, 1915.

1,230,413.

Patented June 19, 1917.

G. E. Kinch.
Inventor.

By Ebroydon Marks
Attorney.

UNITED STATES PATENT OFFICE.

GEORGE EDWARD KINCH, OF QUIRINDI, NEW SOUTH WALES, AUSTRALIA.

NIGHT-SOIL PAN AND DESTROYABLE LINING THEREFOR.

1,230,413.  Specification of Letters Patent.  Patented June 19, 1917.

Application filed October 14, 1915. Serial No. 55,849.

*To all whom it may concern:*

Be it known that I, GEORGE EDWARD KINCH, subject of the King of Great Britain and Ireland, residing at "The Poplars," Quirindi, New South Wales, Australia, have invented new and useful Improvements in Night-Soil Pans and Destroyable Linings Therefor, of which the following is a specification.

This invention has been devised to facilitate the emptying and cleansing of nightsoil pans and to obviate unnecessary fouling of the pans in use; it comprises attachments to the pan operating to assist in the discharge of the contents when the pan is inverted, and a destroyable liner for a pan which liner incloses the contents and is discharged therewith and so operates to prevent direct contact of the contents with the metal surfaces of the pan.

The liner is a sack crimp molded from a single sheet of non absorbent paper, and formed with tapering sides, concave bottom, and beaded and reinforced top edge or rim adapted to embrace the rim bead of the pan. The pan attachments are (1) a disk of concave section forming a loose false bottom in the pan and secured thereto by a short length of chain, and operating when the pan is inverted as an ejector which insures discharge of the liner; and (2) an air by-pass vent which operates to allow air to enter rearward of the liner when the pan is being discharged.

Figure 1:
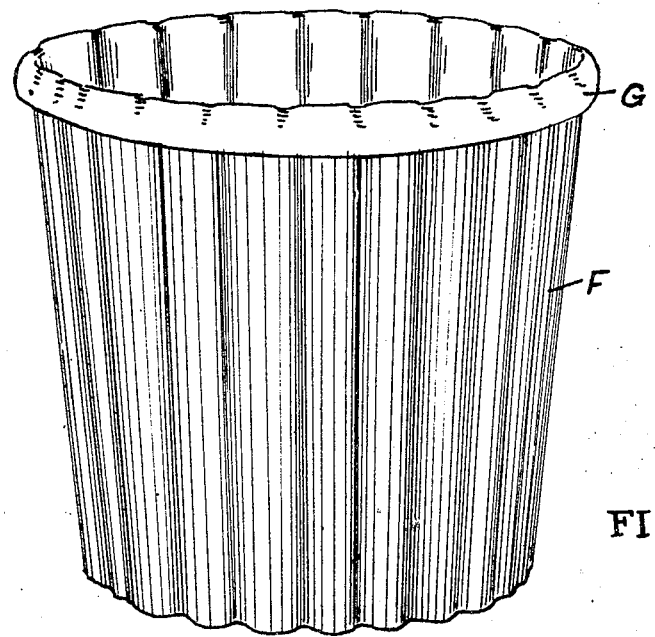
Figure 2:
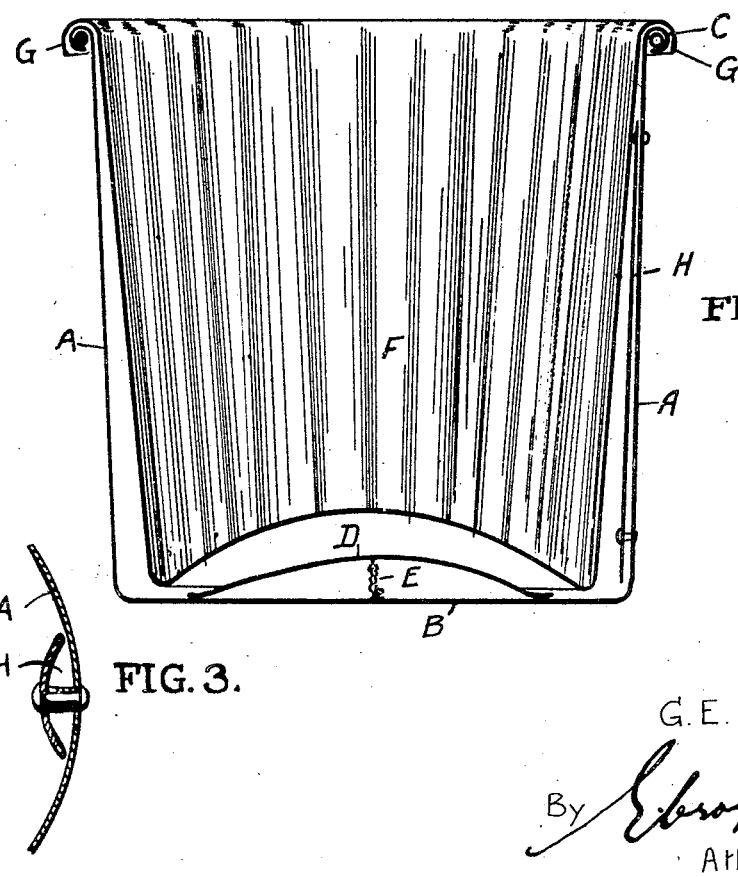
Figure 3:
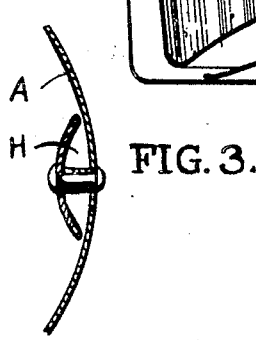

In the accompanying drawings Figure 1 is a perspective view of a loose liner according to my invention, Fig. 2 a vertical section through a pan fitted with an ejector and an air vent, and carrying a loose sack liner, and Fig. 3 is a detail cross section showing the air vent.

A, A are the pan walls, B the pan bottom, C the pan rim bead, D the ejector plate, E chain stirrup securing the ejector plate D to the pan bottom B, F the paper liner, G the beaded rim of the liner F. H is an air by-pass vent extending from near the bottom to near the top of the pan. This vent H as clearly seen from Fig. 3 is a curved slat of metal riveted to the pan wall so as to leave a small intervening channel for air.

The ejector plate D is a dished disk of iron of smaller diameter than the pan bottom; it is secured to the pan bottom by a chain stirrup E which is a few inches long; this stirrup permits the ejector plate to act as a "follower" when the pan is inverted and so facilitate the discharge of the liner F in an unbroken condition.

The liner F is formed by crimping a sheet of tough non absorbent paper in a die and die box of appropriate section to produce a crimped or vertically plaited taper structure with beaded over rim and inwardly dished bottom. The rim is reinforced by a serving of insoluble glue whereby the overlaps of the crimps are secured together and a substantially rigid hollow bead formed adapted to set over the rim C of the pan. The tapered section of the liner enables the "nesting" of a number of liners in minimum space for packing purposes and easy insertion into the pan, while the crimped walls offer facility for expansion whereby the liner is permitted to spread toward the pan sides and bottom when charged.

In "emptying" the pan by inverting it the paper liner is discharged and destroyed with its contents, the follower D pushing the bottom of the liner downward and so operating to prevent rupture of the liner and consequent direct contact of the contents of the pan with the bottom or sides thereof. Air passes freely through the vent H and relieves the partial vacuum which might otherwise interfere with the free discharge of the liner and its contents.

What I claim as my invention is:—

1. The combination with a nightsoil pan of a liner fitted loosely therein, a loose disk false bottom within said pan, a chain connected to the permanent bottom of the pan and to the false bottom, said false bottom being adapted when the pan is inverted to operate as a follower to facilitate the ejection of said liner, and a by-pass air vent adapted to admit air to the bottom of the pan.

2. The combination with a nightsoil pan of a liner fitted loosely therein so as to leave a space between its lower end and the pan bottom, and means normally lying inoperatively within said space but movable to engage the lower end of the liner to eject said liner when the pan is inverted.

3. The combination with a nightsoil pan of a liner fitted loosely therein, and a follower plate loosely arranged between the lower end of the liner and the pan bottom, and movable to engage said lower end to eject said liner when the pan is inverted, and a flexible connection between the plate and the pan bottom.

4. The combination with a nightsoil pan of a liner fitted loosely therein so as to leave a space between its lower end and the pan bottom, means normally lying inoperatively within said space but movable to engage the lower end of the liner to eject said liner when the pan is inverted, and a by-pass for admitting air to the space between the lower end of the liner and the pan bottom.

In testimony whereof I have signed my name to this specification in the presence of two subscribing witnesses.

GEORGE EDWARD KINCH.

Witnesses:
W. J. DAVIS,
H. C. CAMPBELL.